US012735279B2

(12) United States Patent
Neubauer et al.

(10) Patent No.: US 12,735,279 B2
(45) Date of Patent: Sep. 15, 2026

(54) TRANSPORT DEVICE

(71) Applicant: Krones AG, Neutraubling (DE)

(72) Inventors: Michael Neubauer, Grassau (DE); Stefan Elsperger, Söchtenau (DE); Hartmut Davidson, Zeitlarn (DE)

(73) Assignee: Krones AG, Neutraubling (DE)

(*) Notice: Subject to any disclaimer, the term of this patent is extended or adjusted under 35 U.S.C. 154(b) by 85 days.

(21) Appl. No.: 18/985,900

(22) Filed: Dec. 18, 2024

(65) Prior Publication Data

US 2025/0223117 A1 Jul. 10, 2025

(30) Foreign Application Priority Data

Jan. 4, 2024 (DE) ......................... 102024100185.2

(51) Int. Cl.
*B65G 54/02* (2006.01)
*B65G 43/00* (2006.01)
(Continued)

(52) U.S. Cl.
CPC ............. *B65G 54/02* (2013.01); *B65G 43/00* (2013.01); *B65G 47/848* (2013.01);
(Continued)

(58) Field of Classification Search
CPC .... B65G 47/847; B65G 47/848; B65G 54/02; B65G 43/00; B65G 2201/0244;
(Continued)

(56) References Cited

U.S. PATENT DOCUMENTS 2,821,300 A * 1/1958 Bofinger ................... B03C 1/30 209/636
3,120,891 A * 2/1964 Cmiel .................... B65G 54/02 198/690.1
(Continued)

FOREIGN PATENT DOCUMENTS

DE 102011078555 A1 * 1/2013 ............. B65G 54/02
DE 10 2016 224 951 A1 6/2018
(Continued)

OTHER PUBLICATIONS

European Search Report for the European Application No. 24222968.0, mailed on May 9, 2025, 69 pages.
(Continued)

*Primary Examiner* — James R Bidwell
(74) *Attorney, Agent, or Firm* — Lowenstein Sandler LLP

(57) ABSTRACT

A transport device for a bottle filling plant includes at least two transport elements, each having a transport element magnetic force unit and at least one functional element for transporting components. The transport device further includes a bearing unit configured to support the at least two transport elements one after the other and independently of one another along a transport path. The transport device further includes a transport path magnetic force unit arranged along the transport path and configured to drive the transport elements along the transport path by interacting with the transport element magnetic force units of the at least two transport elements. The transport path magnetic force unit includes individual bar magnets mounted on separately controllable motors or actuators or driven by the separately controllable motors or actuators and which, through movement, generate a moving magnetic field to individually drive each of the at least two transport elements along the transport path.

20 Claims, 3 Drawing Sheets

(51) Int. Cl.
*B65G 47/84* (2006.01)
*B65G 47/86* (2006.01)
*H02K 41/03* (2006.01)

(52) U.S. Cl.
CPC ......... *H02K 41/033* (2013.01); *B65G 47/847* (2013.01); *B65G 2201/0244* (2013.01); *B65G 2203/0283* (2013.01); *B65G 2203/041* (2013.01); *H02K 41/031* (2013.01)

(58) Field of Classification Search
CPC ...... B65G 2203/0283; B65G 2203/041; H02K 41/031; H02K 41/033
USPC ............................................... 198/805, 478.1
See application file for complete search history.

(56) References Cited

U.S. PATENT DOCUMENTS

| | | | | |
|---|---|---|---|---|
| 5,377,816 | A | 1/1995 | Deligi et al. | |
| 5,906,262 | A | 5/1999 | Miki | |
| 2010/0037988 | A1* | 2/2010 | Wilhelm | B67C 3/22 141/129 |
| 2015/0014126 | A1* | 1/2015 | Snow | B65G 29/00 198/803.6 |

FOREIGN PATENT DOCUMENTS

| | | | | |
|---|---|---|---|---|
| DE | 10 2017 101 331 A1 | 7/2018 | | |
| DE | 102019005796 A1 | 2/2021 | | |
| DE | 11 2014 006 700 B4 | 12/2022 | | |
| DE | 10 2017 119 766 A1 | 1/2023 | | |
| DE | 102017119766 B4 * | 1/2023 | | B65G 47/847 |
| EP | 2995381 A1 * | 3/2016 | | B65G 54/02 |
| JP | H0664747 A | 8/1994 | | |
| JP | 2000-142 935 A | 5/2000 | | |
| KR | 20120118800 A | 10/2012 | | |
| TW | 201300303 A | 1/2013 | | |
| WO | 2018/049119 A1 | 3/2018 | | |

OTHER PUBLICATIONS

German Search Report for the German Application No. 10 2024 100 185.2, mailed on Nov. 5, 2024, 5 pages.

* cited by examiner

TRANSPORT DEVICE

RELATED APPLICATIONS

This application claims the benefit under 35 U.S.C. § 119(a) of German Application No. 102024100185.2, filed Jan. 4, 2024, the entire content of which is hereby incorporated by reference.

TECHNICAL FIELD

The present disclosure relates to a transport device in a processing line of apparatuses for treating containers and in particular beverage containers. Such processing lines with, for example, filling apparatuses or stretch blow molding apparatuses for plastic containers, inspection apparatuses, transport apparatuses, packaging apparatuses, marking apparatuses or labeling apparatuses are known.

BACKGROUND

Transport devices that transport containers on a circular transport path between apparatuses of a processing line are known. In processing lines, some individual transported containers are faulty, damaged or no longer meet requirements due to wear and tear. Such containers are sorted out and discharged by a container sorting apparatus. This results in gaps within the container flow. In individual cases, some containers leave the transport path unintentionally. This also leads to defects in the container section. Such defects have a negative impact on the system efficiency and may be compensated by overperformance of other apparatuses.

Patent document DE10 2017 101 331 discloses a transport device for transporting containers. The transport device has independently movable arms with grippers that grasp containers and transport them one after the other on a circular path. A circular long stator linear motor (LLM) may be provided as the central drive element. In contrast to a conventional transport device, this apparatus can transport the individual containers one after the other at an individual speed. This makes it possible to compensate for a pitch distortion or to accommodate containers that are fed onto a conveyor belt at irregular intervals, such as through the gaps described above. Here, the individual arms synchronize and bring the picked-up containers to the desired pitch during transport from a pick-up point to a delivery point in order to then be able to hand the containers over to a subsequent machine (e.g., a filler or a labeling apparatus).

The patent document DE10 2016 224 951 A1 discloses a similar transport device, with a stator and at least one transport body, wherein the transport device conveys the transport body in a controlled manner relative to the stator, wherein the stator or the at least one transport body has several movably arranged actuating magnets, which are each connected to the stator or transport body via a central actuating element. The actuating element changes the position of the associated actuating magnet relative to the stator in a controlled manner. The stator and the transport body are magnetically coupled and the transport device moves the transport body relative to the stator through controlled positioning of the actuating magnets.

However, there are also known disadvantages from the above-mentioned transport devices. These disadvantages include the fact that known systems operate unreliably and often fail due to overload. Thermal losses of the central drive of some transport devices require external cooling at higher power levels. The drive of large magnet segments results in high cogging torques at the transitions to the permanent magnets of the transport bodies, which makes a sliding movement of the transport bodies difficult, especially at low speeds. In addition, large segments within the transport system complicate both the adaptability and conversion options of transport devices as well as accessibility for maintenance and cleaning.

SUMMARY

The present disclosure provides a space-saving transport device for the individual transport of components, which enables components to be transported in a resource-saving and reliable manner.

BRIEF DESCRIPTION OF THE FIGURES

The accompanying figures show, by way of example, aspects and/or embodiments of the present disclosure for better understanding and illustration.

DETAILED DESCRIPTION OF EMBODIMENTS

Figures 1A, 1B:
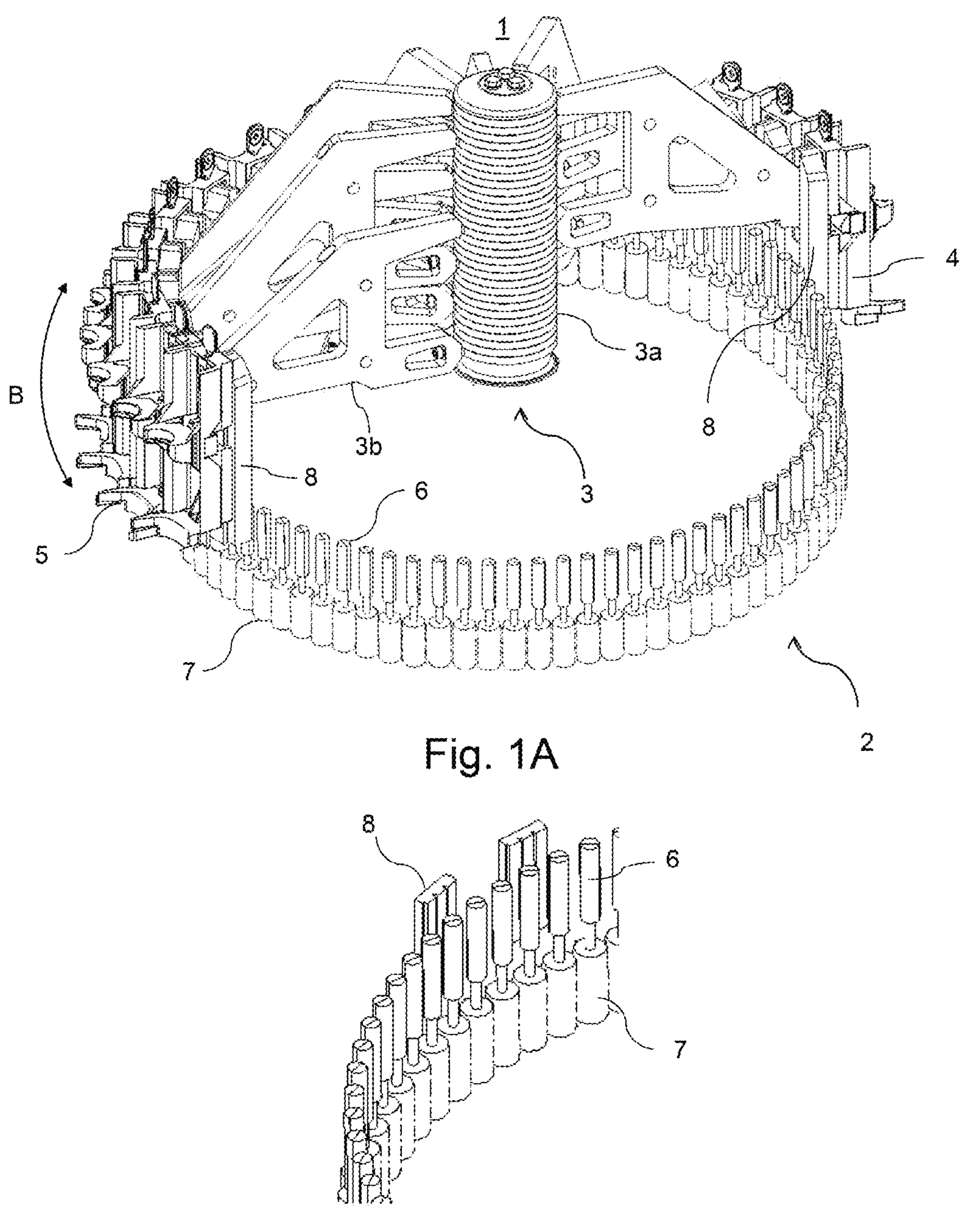
FIG. 1A shows a perspective view of a transport device according to a first embodiment.
FIG. 1B shows a perspective view of a section of a transport path magnetic force unit according to the first embodiment.

A transport device according to embodiments of the present disclosure for a component treatment system, in particular a bottle filling system, comprises at least two transport elements, each of which has a transport element magnetic force unit and at least one functional element that is intended for transporting components, and a bearing unit that is configured to support the at least two transport elements one after the other and independently of one another along a transport path and a transport path magnetic force unit which is arranged along the transport path and which is configured to drive the transport elements along the transport path by interacting with the transport element magnetic force units of the at least two transport elements, wherein the transport path magnetic force unit consists of individual bar magnets that are mounted on separately controllable motors or actuators or driven by the and, through movement, generate a traveling magnetic field that can drive each of the at least two transport elements along the transport path individually.

The transport device according to embodiments of the present disclosure provides, as a drive unit of the transport elements, a transport path magnetic force unit, which consists of a large number of individual bar magnets. This may provide a higher magnetic flux density and thus a higher performance. The use of the individual, comparatively small bar magnets may also represent an individualization and simplification of the form of the transfer device, which may enable a wider range of applications for such a flexible transfer device. By individually controlling the motors or actuators of the bar magnets, the control can be made significantly easier compared to other solutions.

The transport device can further comprise a position detection apparatus for detecting the positions of the at least two transport elements, as well as the components, wherein the position detection apparatus may be a camera. The transport device can also comprise a control apparatus which, based on the results of the position detection apparatus, controls the motors or actuators separately in such a way as to drive the at least two transport elements by the bar magnets along the transport path and to transport the transport elements by a functional element. This may provide a reliable control of each individual bar magnet and thus a controlled build-up of the moving magnetic field. In addition, the detection of the positions of the components may ensure their reliable pick-up.

It may be useful for the individual bar magnets to be arranged rotatably on the motors or actuators, and with a rotation axis perpendicular to a plane spanned by the transport path in some embodiments. Thus, a simple change of the moving magnetic field can be provided by rotating the motors or actuators. A perpendicular arrangement of the rotation axis of the bar magnets generates field lines of the magnetic fields, which makes the moving magnetic field easier to control and usable to drive the transport elements.

The transport path can be circular, oval or meandering. Therefore, the transport device can be used in processing lines in a versatile manner and as required.

It can be provided that a ratio of the number of bar magnets in the transport path magnetic force unit to the number of transport elements on the transport path is at least 2:1, and may be 3:1 in some embodiments. This may provide a sufficiently strong magnetic field that is built up by the bar magnets in order to drive the transport element magnetic force unit of the transport elements reliably and continuously, especially when two transport elements are moved close to each other.

A further optional aspect of the present disclosure is that the at least two transport elements are arranged contactlessly on the transport path with the bearing unit. Therefore, the transport elements can be moved on the transport path without friction losses and without disruption.

It may be useful for the bar magnets to be diametrically magnetized bar magnets or to consist of a shaft with magnets applied on both sides. This may provide uniform magnetic fields of the bar magnets with defined field lines, which make the moving magnetic field easier to control and usable to drive the transport elements.

It can be provided that the transport element magnetic force unit consists of a ferromagnetic carrier body with permanent magnets of alternating polarity attached thereto. Such permanent magnets are easily accessible and inexpensive.

A further optional aspect of the present disclosure is that the separately controllable motors or actuators are electric motors, with encoder feedback in some embodiments, and may be servo motors or pneumatic cylinders in some embodiments. This facilitates precise driving of the bar magnets in order to change the moving magnetic field as required for the transport of the transport elements.

It can be provided that the bearing unit consists of a central shaft and arms, more than five in some embodiments, more than eight in some embodiments, and twelve arms in some embodiments, wherein the arms are mounted on the shaft and hold the at least two transport elements, so that the transport elements have only one degree of freedom of movement. The bearing unit can also be a rail system along the transport path, which rail system holds the at least two transport elements, hanging in some embodiments, so that the transport elements have only one degree of freedom of movement. Thus, the transport elements may be moved in the direction of the transport path, meaning that superpositions of the magnetic fields and the resulting magnetic forces may not move a transport element out of the transport path.

A further optional aspect of the present disclosure is that bar magnets arranged next to one another along the transport path may be arranged at a different height, one of two heights in some embodiments, or bar magnets arranged next to one another have a different length. Here, the height of the bar magnets is chosen so that two adjacent bar magnets may no longer be directly opposite each other. Thus, magnetic interactions between each other are significantly reduced or even eliminated.

It can be provided that the functional element is a gripper, a guide element, and/or a receiving element that holds the components in a frictionally engaged or form-fitting manner. Accordingly, the components held by the transport elements are transported reliably.

A further aspect of the present disclosure is a component treatment plant comprising a transport device according to one of the preceding aspects, wherein the transport path and the at least two transport elements are part of a transport device and/or a blow molding machine and/or a finishing machine and/or a filling machine and/or an inspection unit and/or a marking unit and/or a packaging machine and/or a feed unit for piece goods such as preforms or closures.

A transport method according to the present disclosure for a component treatment plant, in particular a bottle filling plant, comprises at least two transport elements, each having a transport element magnetic force unit and at least one functional element for transporting components, and the at least two transport elements are transported one after the other and independently of one another along a transport path by a transport path magnetic force unit arranged along the transport path, in that the transport element magnetic force unit of the respective transport element and the transport path magnetic force unit interact magnetically, wherein each transport element is mounted with a bearing unit, wherein the transport path magnetic force unit consists of individual bar magnets that are mounted on separately controllable motors or actuators or driven by them and generate a traveling magnetic field that individually drives each of the at least two transport elements along the transport path.

Further developments of the present disclosure are provided from combinations of the features disclosed in the description, the claims and the figures.

Referring to the figures, FIG. 1A shows a perspective view of a transport device 1 according to a first embodiment. The transport device 1 is, for example, part of a processing line formed of apparatuses for treating components such as containers and in particular beverage containers. In the following a component in the form of a container is assumed. However, components can also be closures such as screw caps, crown caps or lids, preforms for a (e.g., stretch) blow molding process for producing containers such as bottles and beverage cans, as well as packaging and the like.

The entire processing line is modular and consists of transport devices, blow molding apparatuses, filling apparatuses, inspection apparatuses, finishing machines, packaging apparatuses, marking apparatuses, labeling apparatuses and the like, which carry out processing steps on containers. Mobile supply apparatuses can also be attached to the processing line. Through conversion work, the processing line can be modified as required so that the processing line can process containers made of different materials in different sizes and quantities.

FIG. 1A shows the transport device 1 as a flexible transfer star, which has a bearing unit 3 consisting of a central shaft 3*a* with a vertical axis and radially outwardly extending arms 3*b*. The arms 3*b* are mounted on the shaft 3*a* in such a way that they can move around the central shaft 3*a* one after the other and independently of each other. The arms 3*b*, for example, are profiles that partially have recesses and taper radially outwards. Thus, the weight of the arms 3*b* and thus bearing forces in the central shaft 3*a* can be reduced. A transport element 4 is arranged at the radial end of each arm 3*b*. By supporting the arms 3*b* in the bearing unit 3, the transport elements 4 at the radial end of each arm 3*b* can be moved on a circular transport path B. FIG. 1A shows the bearing unit 3 with eight arms 3*b*. In some embodiments, a bearing unit 3 has more than five and up to twelve arms 3*b*.

Each of the transport elements 4 has on its radially outward side a functional element 5 in the form of a gripper which grips a container, for example a bottle. The functional element 5 can have a gripping mechanism that actively grips a container. However, the functional element 5 can also be formed as a guide element and/or as a receiving element which holds the container in a frictionally engaged and/or form-fitting manner. For example, a container can be pressed against a guide rail running radially around the outside of the transport path B in order to be held by the functional element 5.

Each of the transport elements 4 has a transport element magnetic force unit 8 on its radially inner side. The transport element magnetic force unit 8 consists of a ferromagnetic carrier body with permanent magnets attached thereto in some embodiments.

The entirety of the transport element 4 with the functional element 5 is rigidly attached to the end of each arm 3*b* in such a way that the transport elements 4 have only one degree of freedom of movement, which allows movement along the transport path B by rotating the arms 3*b* about the shaft 3*a*. A bilateral movement in the direction of the transport path B is possible. In addition, the transport element 4 is attached to the end of each arm 3*b* in such a way that the transport element 4 projects downwards in a vertical L-shape over a lower portion of the arm 3*b*.

FIG. 1A shows a transport path magnetic force unit 2 below the bearing unit 3. The transport path magnetic force unit 2 is a circular arrangement of bar magnets 6 located within the transport path B which are rotatably mounted on motors 7 or actuators 7. The individual bar magnets 6 and the motors 7 or actuators 7 have a common axis of rotation which is perpendicular to a plane spanned by the transport path B. The bar magnets 6 are arranged at a height and in a circle with a radius such that a magnetic field of the bar magnets 6 can enter into magnetic interaction with a magnetic field of the transport element magnetic force units 8. The center of the circle on which the bar magnets 6 are arranged coincides with the center of the central shaft 3*a*.

FIG. 1B shows a perspective view of a section of a transport path magnetic force unit 2 according to the first embodiment. For the sake of simplicity, two transport element magnetic force units 8 are shown without the adjacent transport element 4 and the functional element 5. The transport element magnetic force units 8 orbit the circle of bar magnets 6 on the transport path B. The transport elements 4 are mounted around the bar magnets 6 by the bearing unit 3 in such a way that there is no contact between the bar magnets 6 and the transport element magnetic force units 8. The rotation of the bar magnets 6 can be carried out electrically, pneumatically, hydraulically, or the like.

It is also conceivable that the bar magnets 6 are moved linearly in the radial direction relative to the transport path B. Thus, the distance to the passing transport element magnetic force units 8 is varied by varying the distance between adjacent bar magnets 6 and the transport path B. By a corresponding change in the distances of the bar magnets 6, a propulsion force is generated on the transport element magnetic force units 8. The linear movement of the bar magnets 6 can be generated, for example, electrically, hydraulically or pneumatically.

Figure 2A:
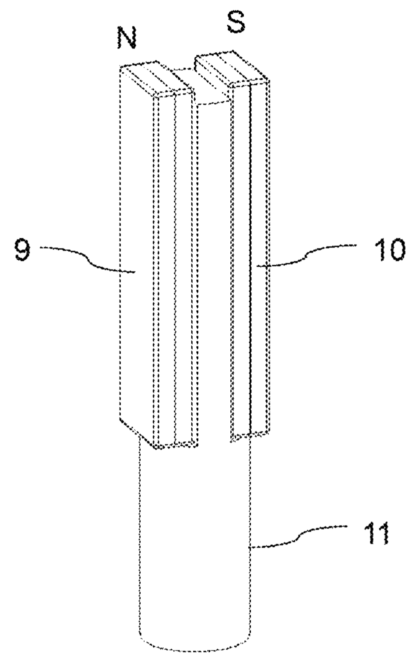
FIG. 2A shows a perspective view of a bar magnet.

FIG. 2A shows a perspective view of a bar magnet 6. The bar magnet 6 consists of a round shaft 11. Magnets 9, 10 are attached to both sides of the upper side of the shaft 11. The positive polarity (e.g., N polarity) of magnet 9 points outwards. The negative polarity (e.g., S polarity) of the magnet 10 opposite the magnet 9 points outwards. The shaft 11 is suitable for being mounted on a motor 7. The bar magnets 6 can also be a diametrically magnetized bar magnet 6, which can be placed on a motor 7. The motors 7 or actuators 7 are separately controllable motors 7. These can be electric motors, motors with encoder feedback, servo motors or pneumatic cylinders.

Figure 2B:
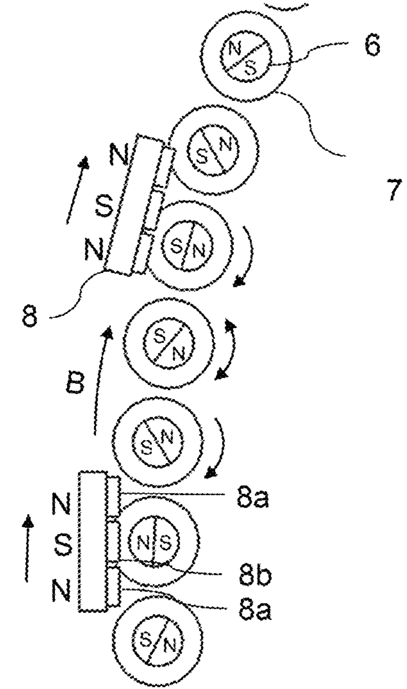
FIG. 2B shows a plan view of bar magnets arranged in a transport path in interaction with transport element magnetic force units.

FIG. 2B shows a plan view of a row of bar magnets 6 arranged in transport path B in interaction with two transport element magnetic force units 8. The transport element magnetic force units 8 are driven by the bar magnets 6 and moved along the transport path B, in FIG. 2B from bottom to top. The bar magnets 6 are driven by the separately controllable motors 7 or actuators 7. The bar magnets 6 rotate about their own axis and are oriented either with their positive polarity (e.g., N polarity) or their negative polarity (e.g., S polarity) in the direction of the transport element magnetic force unit 8. The extent of the transport element magnetic force unit 8 is selected such that the entire length of the magnetic portion of the bar magnet 6 is covered as it passes by.

The bar magnets 6 can also be driven and moved by actuators 7, such as pneumatic cylinders. The bar magnets 6 are mounted on the actuators 7. The bar magnets 6 do not have to be mounted directly on the actuators 7. The mounting can also be ensured by separate machine elements (not shown).

The transport element magnetic force unit 8 has permanent magnets of alternating polarity 8*a*, 8*b* (e.g., alternating NSN polarity) on its ferromagnetic carrier body. By opposing a positive polarity (e.g., N polarity) of the bar magnet 6 and a negative polarity 8*b* of the transport element magnetic force unit 8, an attraction force is created which brings the transport element magnetic force unit 8 together with the bar magnet 6. By opposing a negative polarity (e.g., S polarity) of the bar magnet 6 and the negative polarity 8*b* of the transport element magnetic force unit 8, a repulsion force is produced which pushes the transport element magnetic force unit 8 away from the bar magnet 6. By opposing a negative polarity (e.g., S polarity) of the bar magnet 6 and a positive polarity 8*a* of the transport element magnetic force unit 8, an attraction force is created which brings the transport element magnetic force unit 8 together with the bar magnet 6. By opposing a positive polarity (e.g., N polarity) of the bar magnet 6 and the positive polarity 8*a* of the transport element magnetic force unit 8, a repulsion force is produced which pushes the transport element magnetic force unit 8 away from the bar magnet 6.

By rotating the motors 7 and the associated rotation of the bar magnets 6, the magnetic fields can be superimposed in such a way that the transport element magnetic force unit 8 is moved along the transport path B. The interaction of attraction and repulsion by the rotating bar magnets 6 leads to the driving of the transport element magnetic force unit 8 along the transport path B. The rotation of the bar magnets 6 by the motors 7 is shown by arrows in FIG. 2B. It is possible that individual bar magnets 6 (shown in the middle) do not rotate continuously in one direction, but change direction briefly. This offers the possibility that the required polarity side of the bar magnet 6 is available in time to attract or repel a transport element magnetic force unit 8.

In FIG. 2B, two transport element magnetic force units 8 and seven bar magnets 6 are shown. In order to ensure that there is sufficient space between the transport elements 4 for the individual movement of the transport elements 4, twice as many bar magnets 6 as transport elements 4 are arranged in the full circle of the transport path B in some embodiments. The ratio of the number of bar magnets 6 in the transport path magnetic force unit 2 to the number of transport elements 4 on the transport path B is therefore at least 2:1. In some embodiments, the ratio can also be 3:1. However, it is also conceivable that the number of bar magnets 6 is significantly larger than the number of transport elements 4. This provides sufficient room for movement between the transport elements 4. This allows the transport elements 4 to be closed to one another or allows the transport elements 4 to be removed from one another, for example to compensate for imperfections within a row of transported containers.

In addition to the arrangement of the transport element magnetic force units 8 (e.g., N-S-N polarity) shown in FIG. 2B, it is also conceivable that for all magnets of a transport element magnetic force unit 8 one and the same pole points inwards towards the bar magnets 6 (e.g., N-N-N polarity, or S-S-S polarity). It is also conceivable that the magnet orientation changes with each transport element magnetic force unit 8, i.e., first transport element magnetic force unit 8 with a polarity N-N-N, second transport element magnetic force unit 8 with a polarity S-S-S, third transport element magnetic force unit 8 with a polarity N-N-N, etc. Furthermore, it is also conceivable that the transport element magnetic force units 8 have an even number of magnets, i.e., for example a polarity N-S-N-S, or S-N-S-N. In principle, the magnets on the transport element magnetic force units 8 should be attached in such a way that the bar magnets 6 can generate the most suitable attraction and repulsion forces possible, which are suitable for generating the desired movement of the transport element magnetic force units 8.

The transport device 1 comprises a position detection apparatus (not shown) for detecting the positions of the transport elements 4. The position detection apparatus is a high-resolution camera in some embodiments. The position detection apparatus can detect the transport elements 4 with their transport element magnetic force units 8 even at high speeds of the transport elements 4. In addition, the position detection apparatus can detect whether the functional element 5 of a transport element 4 is carrying a container or not.

In addition, a position detection apparatus can be used which extends above the bar magnets around the entire transport device 1. Such a position detection apparatus is able to precisely detect the positions of the transport elements 4 passing by at a short distance. For this purpose, it is advantageous if the transport element magnetic force units 8 of the transport elements 4 protrude beyond the bar magnets 6. Alternatively, other types of position detection systems can be used. It is also conceivable that additional objects are attached to the arms 3*b*, which can be detected by a sensor unit so that conclusions can be drawn about the current position of the transport elements 4.

The transport device 1 also comprises a control apparatus (not shown) which is connected wirelessly to the position detection apparatus in some embodiments. Based on the results of the position detection apparatus, the control apparatus controls the motors 7 individually so that the magnetic fields of the bar magnets 6 interact with the magnetic fields of the transport element magnetic force units 8 such that the transport elements 4 are driven along the transport path B. Each individual transport element 4 is continuously detected by the position detection apparatus. Bar magnets 6 opposite the transport element 4 are rotated by individual control of the associated motors 7 in such a way that a sliding guide of the transport element 4 along the transport path B is provided. Thus, the transport elements 4 can be driven individually along the transport path B. The control apparatus is also configured to control the direction of movement of the transport elements 4 along the transport path B and their speed.

Figures 3, 4:
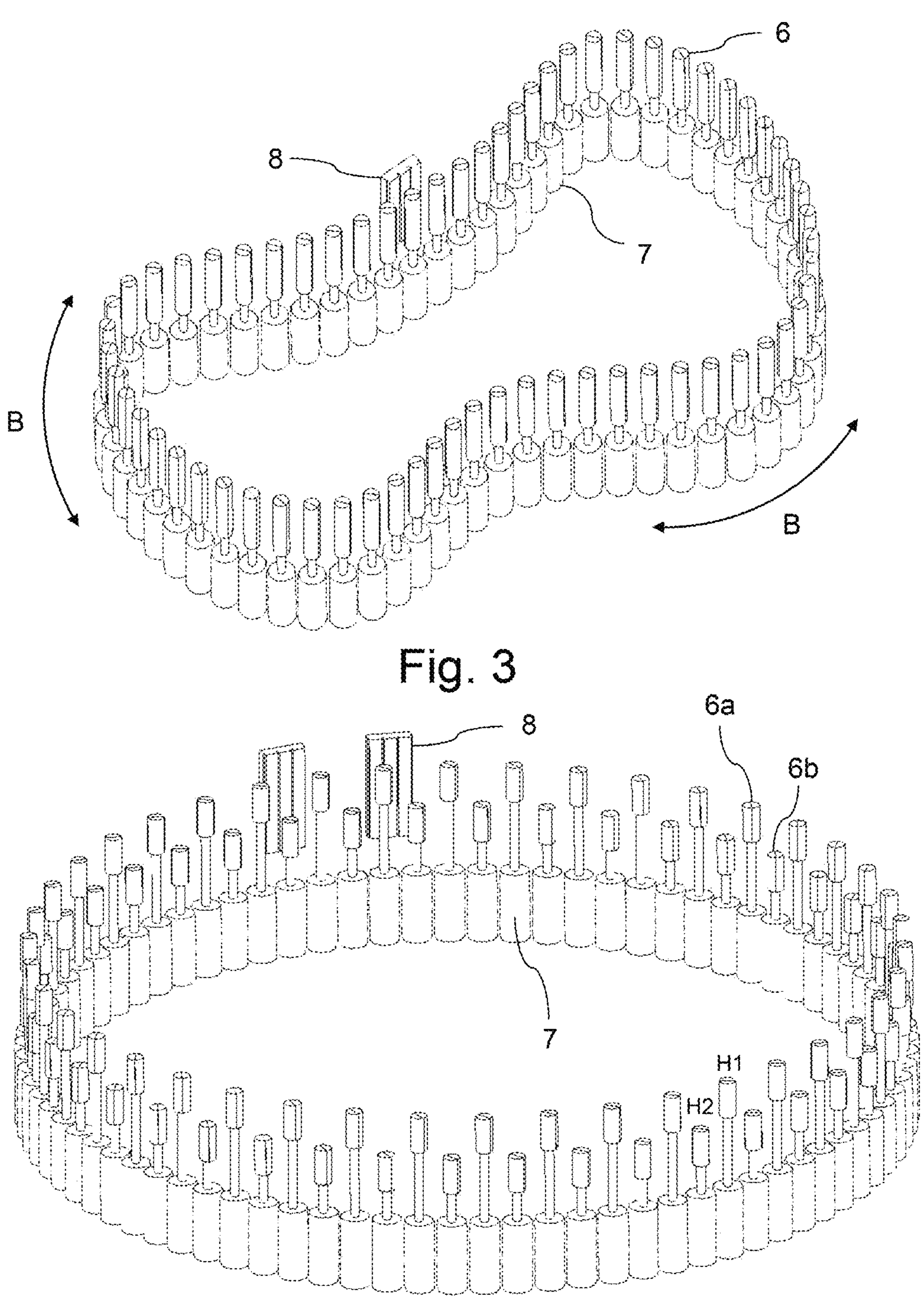
FIG. 3 shows a perspective view of a transport path magnetic force unit according to a second embodiment.
FIG. 4 shows a perspective view of a transport path magnetic force unit according to a third embodiment.

FIG. 3 shows a perspective view of a transport path magnetic force unit 2 according to a second embodiment. FIG. 3 is limited to the representation of the transport path magnetic force unit 2. The transport path B is arranged in a meandering shape. The arrangement of the bar magnets 6 forms a closed meander. The transport element magnetic force units 8 are, as shown in FIG. 3, further driven by the arrangement of the bar magnets 6 on the outside circumferentially on the transport path B. The drive of the transport elements 4 functions analogously to that described above. The meandering shape of the transport device 1 ensures that complex requirements for container transport paths B in a processing line can be met as required.

In the second embodiment, the bearing unit 3 is formed such that the transport elements 4 are guided on the meandering transport path B. This is done, for example, by a rail system along the transport path B, which holds the transport elements 4, hanging in some embodiments, so that the transport elements 4 only have one degree of freedom of movement along the transport path B. Furthermore, it is conceivable that the bearing unit 3 is formed such that, as in the first embodiment, it has a central shaft 3*a* and the arms 3*b* each have at least one telescopic mechanism by means of which the length of the arm 3*b* can be varied. Combination solutions consisting of a rail system and the bearing unit 3 with telescopic arms are also conceivable. It is also conceivable that the transport path B has an oval shape or another irregular shape or the like. In addition to an arrangement of a circular, oval or meandering transport path B, any other contours such as straight lines, curves, etc. or any combination of these are conceivable, which do not represent a self-contained transport path B. This means that transport paths B can also be realized with curved profiles that are tailored to specific applications (e.g., pitch delay star).

FIG. 4 shows a perspective view of a transport path magnetic force unit 2 according to a third embodiment. FIG. 4 is limited to the illustration of the transport path magnetic force unit 2 and shows two transport element magnetic force units 8 and a plurality of bar magnets 6 arranged on a circular transport path B. As shown in FIG. 4, bar magnets 6*a*, 6*b* arranged next to each other along the transport path B are arranged alternately at different heights H1, H2. In some embodiments, the heights are selected such that the entire magnetic portions of the bar magnets 6 do not overlap in the width direction. The extent of the transport element magnetic force unit 8 is selected such that the entire extent of the magnetic portion of the bar magnets 6*a*, 6*b* is covered as it passes. Due to the different heights H1, H2 of the bar magnets 6*a*, 6*b* arranged next to each other, magnetic interactions between the bar magnets 6 are significantly reduced or even eliminated. Thus, a sliding guidance of the transport elements 4 along the transport path B can be further improved.

The present disclosure is not limited to the described exemplary embodiments. Further modifications and variations of the exemplary embodiments are conceivable. It would thus be possible for the transport elements 4 to have the transport element magnetic force unit 8 on their underside instead of on the back. This allows a more compact structure of the attachment of the transport elements 4 to the arms 3*b*.

It is also conceivable that more than one row of transport elements 4 are transported one above the other in parallel along a transport path B. For this purpose, two rows of bar magnets 6 are arranged at different heights, similar to that shown in FIG. 4, wherein transport elements 4 are arranged opposite each row at the respective height.

In addition to the combination of similar bar magnets 6 with motors 7 and transport element magnetic force units 8, a combination of conventional (e.g., coil-based) long stator linear motor modules and the transport device according to the invention is also conceivable. Thus, for example, a transport path B could be realized in which one part consists of long stator linear motor modules (e.g., in areas with special requirements regarding accuracy, propulsion force, etc.) and another part of the transport device according to the invention.

It is also conceivable that the bearing unit 3 is formed in such a way that transport elements 4 can be guided past one another. This can be achieved by using lifting and telescopic mechanisms in the arms 3*b*. By specifically controlled neutralization of the magnetic forces, transport elements 4 can be moved radially out at a position in the transport path B so that they can be overtaken by other transport elements 4. This enables the sorting out of faulty containers within transport unit 1.

In addition, it is conceivable that the transport device 1 has several receiving, delivery and transfer positions, which can be arranged along the transport path B. Upstream or downstream apparatuses that transfer or receive containers can be attached tangentially or radially to the transport path B. This allows the containers to be picked up and passed on at the same time.

It is also conceivable that the transported containers are bundles of several containers that are transported by the transport device 1.

The described transport device 1 is not limited to being used in a container treatment plant. Other applications in assembly lines, packaging lines and the like are also conceivable.

While the present disclosure has been described with respect to specific embodiments for the purpose of full and clear disclosure, the appended claims are not to be so limited, but are to be construed to embody all modifications and alternative constructions that may reasonably occur to a person skilled in the art which fall within the scope of the claims. In addition, the features of various implementation embodiments may be combined to form further embodiments of the present disclosure.

The invention claimed is:

1. A transport device for a component treatment plant, wherein the transport device comprises:

at least two transport elements, each having a transport element magnetic force unit and at least one functional element for transporting components;

a bearing unit configured to support the at least two transport elements one after the other and independently of one another along a transport path; and a transport path magnetic force unit arranged along the transport path and configured to drive the transport elements along the transport path by interacting with the transport element magnetic force units of the at least two transport elements, wherein the transport path magnetic force unit comprises individual bar magnets mounted on separately controllable motors or actuators or driven by the separately controllable motors or actuators and which, through movement, generate a moving magnetic field to individually drive each of the at least two transport elements along the transport path.

2. The transport device according to claim 1, further comprising:

a position detection apparatus for detecting the positions of the at least two transport elements, and the components; and a control apparatus configured to control the motors or actuators separately based on results of the position detection apparatus to drive the at least two transport elements by the bar magnets along the transport path.

3. The transport device according to claim 1, wherein the individual bar magnets are arranged rotatably on the motors or actuators.

4. The transport device according to claim 1, wherein the transport path is circular, oval or meandering.

5. The transport device according to claim 1, wherein a ratio of a number of bar magnets in the transport path magnetic force unit to a number of transport elements on the transport path is at least 2:1.

6. The transport device according to claim 1, wherein the at least two transport elements with the bearing unit are arranged contactlessly on the transport path.

7. The transport device according to claim 1, wherein the bar magnets are diametrically magnetized bar magnets or comprise a shaft with magnets applied on both sides.

8. The transport device according to claim 1, wherein the transport element magnetic force unit comprises a ferromagnetic carrier body and permanent magnets of alternating polarity attached thereto.

9. The transport device according to claim 1, wherein the separately controllable motors or actuators are electric motors.

10. The transport device according to claim 1, wherein:

the bearing unit comprises a central shaft and arms, wherein the arms are mounted on the shaft and hold the at least two transport elements, so that the transport elements have only one degree of freedom of movement, or the bearing unit is a rail system along the transport path which holds the at least two transport elements, so that the transport elements have only one degree of freedom of movement.

11. The transport device according to claim 1, wherein:

the bar magnets arranged next to one another along the transport path are arranged at a different height, or the bar magnets arranged next to each other have different lengths.

12. The transport device according to claim 1, wherein the functional element comprises at least one of a gripper, a guide element, or a receiving element which holds the components in a frictionally engaged or form-fitting manner.

13. The transport device according to claim 2, wherein the position detection apparatus comprises a camera.

14. The transport device according to claim 3, wherein the individual bar magnets are arranged rotatably on the motors or actuators with a rotation axis perpendicular to a plane spanned by the transport path.

15. The transport device according to claim 5, wherein the ratio of the number of bar magnets in the transport path magnetic force unit to the number of transport elements on the transport path is 3:1.

16. The transport device according to claim 9, wherein the separately controllable motors or actuators comprise servo motors or pneumatic cylinders with an encoder feedback.

17. The transport device according to claim 10, wherein the bearing unit comprises more than five and up to twelve arms.

18. A method for transporting transport elements in a component treatment plant for treating components, comprising:

transporting at least two transport elements, each of which has a transport element magnetic force unit and at least one functional element for transporting components one after the other and independently of one another along a transport path by a transport path magnetic force unit arranged along the transport path, wherein the transport element magnetic force unit of the respective transport element and the transport path magnetic force unit interact magnetically, wherein each transport element is supported with a bearing unit, and wherein the transport path magnetic force unit comprises individual bar magnets mounted on separately controllable motors or actuators or driven by them and which generate a moving magnetic field which can individually drive each of the at least two transport elements along the transport path.

19. A component treatment plant comprising:

a transport device, wherein the transport device comprises:

at least two transport elements, each having a transport element magnetic force unit and at least one functional element for transporting components;

a bearing unit configured to support the at least two transport elements one after the other and independently of one another along a transport path; and a transport path magnetic force unit arranged along the transport path and configured to drive the transport elements along the transport path by interacting with the transport element magnetic force units of the at least two transport elements, wherein the transport path magnetic force unit comprises individual bar magnets mounted on separately controllable motors or actuators or driven by the separately controllable motors or actuators and which, through movement, generate a moving magnetic field to individually drive each of the at least two transport elements along the transport path.

20. The component treatment plant of claim 19, wherein the transport path and the at least two transport elements are part of at least one of the transport device, a blow molding machine, a finishing machine, a filling machine, an inspection unit, a marking unit, a packaging machine, or a feed unit for piece goods.

* * * * *